United States Patent [19]

Carter et al.

[11] Patent Number: 4,562,215

[45] Date of Patent: Dec. 31, 1985

[54] FILLED THERMOPLASTICS

[75] Inventors: Moira A. Carter; Kenneth Barrell, both of Stourbridge, England

[73] Assignee: BIP Chemicals Limited, Manchester, England

[21] Appl. No.: 650,079

[22] Filed: Sep. 13, 1984

[30] Foreign Application Priority Data

Sep. 24, 1983 [GB] United Kingdom ............... 8325606

[51] Int. Cl.$^4$ ............................ C08K 3/26; C08K 3/22
[52] U.S. Cl. .................................... 523/220; 524/413; 524/425
[58] Field of Search .................. 523/220; 524/413, 425

[56] References Cited

U.S. PATENT DOCUMENTS 3,801,536  4/1974  Guenantin ........................... 524/413
3,883,470  5/1975  Bishop ................................ 524/425
4,010,307  3/1977  Canard et al. ...................... 523/220

FOREIGN PATENT DOCUMENTS 58-162655   9/1983  Japan ................................. 523/220
935625      9/1963  United Kingdom .
2017127    10/1979  United Kingdom .

Primary Examiner—Lewis T. Jacobs
Attorney, Agent, or Firm—Cushman, Darby & Cushman

[57] ABSTRACT

A filled thermoplastics composition with a filler of particle size below 1 micron in an amount greater than 25 percent by weight also comprises a second filler whose particle size is different from the first but is below 2 microns.

The mouldability of the composition is substantially improved by the presence of the second filler.

8 Claims, No Drawings

FILLED THERMOPLASTICS

This invention relates to thermoplastics moulding compositions, and in particular such moulding compositions in which it is desirable to incorporate relatively large quantities of filler.

In certain applications, for example, for the manufacture of components intended to have a reflective metallised surface, it is desirable to have a moulding composition which will give a very smooth surface, and thus to use a heavily filled or pigmented composition, where the filler/pigment has a small particle size.

We have found that in thermoplastic materials, such as polyethylene terephthalate the incorporation of large amounts of a filler such as titanium dioxide results in a composition which will not flow properly.

Surprisingly we have also found that a minor change in the filler content of the composition will solve this problem.

Thus according to the present invention a filled thermoplastics composition comprises a thermoplastics polymer, a particulate filler having a particle size less than 1 micron in an amount greater than 25 percent by weight of the total composition and a second filler having a particle size different from that of the first filler but less than 2 microns.

The polymer employed may be any of the mouldable thermoplastics but is preferably a saturated polyester, particularly polyethylene terephthalate. The polymer may also contain other additives such as impact modifiers and nucleants, for example polycaprolactone as described in published UK Application No. 2 132 625 A is a very useful additive in polyethylene terephthalate.

The filler of particle size less than 1 micron is preferably a fine filler which can be used as a pigment, such as titanium dioxide, and other similar materials which normally will give rise to the same problem.

The amount of such filler employed can be well in excess of the 25 percent level mentioned above, e.g. up to 65 percent by weight of the composition, and is preferably greater than 30 percent by weight of the composition, for example from 30 to 50 percent.

The second filler must also be relatively fine in order to achieve the desired effect, and its particle size must be different from the first filler.

For example, if titanium dioxide of particle size 0.2 microns is used the second filler may be microtalc, of particle size 1.2 microns, or 'Calofort' of particle size 0.1 microns.

The amount of the second filler is not critical, but need not be great, thus 0.5% by weight of the composition can be sufficient, and up to 6% by weight of the composition or more may be employed if desired.

The invention will now be described in more detail by means of the following examples.

EXAMPLES

In the following examples 1 to 15 the polymer employed was a bottle grade polyethylene terephthalate blended with a polycaprolactone (CAPA 601P), the amount of the latter being 10 parts by weight per 100 parts by weight total polymer.

A series of filled compositions was prepared by compounding the ingredients in a Welding Engineers extruder.

Test mouldings were made from each composition by injection moulding into a warm mould whose temperature was 120° C. In the tables below compositions are given as parts by weight, the balance (to 100) being the polymer blend mentioned above. CAPA 601P is polycaprolactone of number average molecular weight 47,000, available from Interox Chemicals Ltd.

EXAMPLES 1 TO 3

To test the moulding capability of compositions containing titanium dioxide (0.2 micron), compositions were prepared containing various loadings of titanium dioxide and sodium stearate (as nucleant). Table I below gives details of the compositions and their mouldability.

TABLE I

| Example No | 1 | 2 | 3 |
|---|---|---|---|
| Titanium Dioxide | 20 | 30 | 40 |
| Sodium Stearate | 0.5 | 0.5 | 0.5 |
| Moulded Appearance | glossy | porous | porous |

From this it can be seen that the quality of the mouldings is detrimentally affected by the increasing loading of titanium dioxide.

EXAMPLES 4 TO 8

In these examples a small proportion of microtalc (1.2 micron particles) was added to the compositions. Varying quantities of microtalc and titanium dioxide were tried, and in each case excellent mouldability was found. Details are given in Table 2. In these cases microtalc was used also as nucleant, since it is effective for this purpose.

TABLE 2

| Example No | 4 | 5 | 6 | 7 | 8 |
|---|---|---|---|---|---|
| Titanium Dioxide | 30 | 40 | 40 | 50 | 60 |
| Microtalc | 3.5 | 0.6 | 3.0 | 2.5 | 2.0 |
| Moulded Appearance | smooth and glossy in each case | | | | |

EXAMPLES 9 TO 15

A series of examples was produced as above, in which fillers of other particle sizes were used instead of the microtalc.

The different compositions tried and results obtained are detailed in Table 3 overleaf.

| Example No | 9 | 10 | 11 | 12 | 13 | 14 | 15 |
|---|---|---|---|---|---|---|---|
| Titanium Dioxide | 40 | 40 | 40 | 40 | 40 | 40 | 40 |
| Calcium Carbonate | 3 | 3 | 3 | 6 | 3 | — | — |
| Mica | — | — | — | — | — | 3 | — |
| Glass | — | — | — | — | — | — | 3 |
| Particle size of 2nd filler (μ) | 0.1 | 2 | 5 | 5 | 14 | 400 | (3 mm) |
| Moulded appearance | glossy | porous in each case | | | | | |

From these results it can be seen that only the very fine filler in Example 9 produced the desired effect, the others all being ineffective.

We claim:

1. A filled thermoplastics moulding composition suitable for injection molding which comprises a thermoplastics polymer, a first particulate inorganic filler having a particle size less than 1 micron in an amount greater than 25 percent by weight of the total composition and a second filler having a particle size different from that of the first filler but less than 2 microns.

2. A composition according to claim 1 in which each of the fillers is an inorganic filler.

3. A composition according to claim 2 in which the thermoplastics polymer comprises polyethylene terephthalate.

4. A filled thermoplastics composition which comprises a saturated polyester, at least 25% by weight of the total composition being a first particulate filler having a particle size less than 1 micron and the composition also comprises a second particulate filler, having a particle size different from that of the first filler but less than 2 microns in an amount not less than 0.5% by weight of the composition.

5. A composition according to claim 4 in which the thermoplastics polymer comprises polyethylene terephthalate and a minor proportion of polycaprolactone.

6. A composition according to claim 4 in which the second filler is microtalc, or finely divided calcium carbonate.

7. A composition according to claim 4 in which the amount of the first filler is in the range 30 to 50 percent by weight of the total composition.

8. A composition according to claim 7 in which the amount of the second filler is in the range 0.5 to 6.0 percent by weight of the total composition.

* * * * *